US00854744OB2

(12) United States Patent
Muukki (10) Patent No.: US 8,547,440 B2
(45) Date of Patent: Oct. 1, 2013

(54) IMAGE CORRECTION FOR IMAGE CAPTURING WITH AN OPTICAL IMAGE STABILIZER

(75) Inventor: Mikko J. Muukki, Tampere (FI)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 12/696,382

(22) Filed: Jan. 29, 2010

(65) Prior Publication Data

US 2011/0187877 A1   Aug. 4, 2011

(51) Int. Cl.
    *H04N 5/228*    (2006.01)
    *H04N 9/64*     (2006.01)
    *G03B 17/00*    (2006.01)

(52) U.S. Cl.
    USPC ............... 348/208.11; 348/208.99; 348/251; 296/54

(58) Field of Classification Search
    USPC ............ 348/208.4–208.11, 251; 396/54
    See application file for complete search history.

(56) References Cited

U.S. PATENT DOCUMENTS

| 7,505,067 B2 | 3/2009 | Ogawa et al. | |
|---|---|---|---|
| 2004/0125227 A1 | 7/2004 | Tsuruoka et al. | |
| 2004/0201707 A1 | 10/2004 | Noguchi et al. | |
| 2006/0087707 A1 | 4/2006 | Akaho | |
| 2007/0030379 A1 | 2/2007 | Agranov | 348/340 |
| 2007/0071426 A1 | 3/2007 | Chujo et al. | 396/55 |
| 2007/0103555 A1 | 5/2007 | Eromaki | 348/208.4 |
| 2007/0146489 A1* | 6/2007 | Kosako et al. | 348/208.7 |
| 2008/0278613 A1 | 11/2008 | Hunter et al. | 348/308 |
| 2008/0284879 A1 | 11/2008 | Hu | 348/241 |
| 2008/0291299 A1 | 11/2008 | Kano | |
| 2008/0309772 A1* | 12/2008 | Ikeda | 348/208.7 |
| 2009/0021632 A1 | 1/2009 | Huggett | 348/349 |
| 2009/0160959 A1 | 6/2009 | Watanabe et al. | 348/208.99 |
| 2009/0252488 A1 | 10/2009 | Eromaki et al. | 396/529 |
| 2009/0268053 A1 | 10/2009 | Wang et al. | 348/229.1 |
| 2011/0149112 A1 | 6/2011 | Muukki et al. | |

FOREIGN PATENT DOCUMENTS

| EP | 1 729 509 A2 | 12/2006 |
|---|---|---|
| EP | 1 936 956 A2 | 6/2008 |
| EP | 2 058 763 A1 | 5/2009 |
| JP | 2004048346 A | 2/2004 |
| JP | 2005269130 A | 9/2005 |
| WO | WO 2008/005595 A2 | 1/2008 |
| WO | 2008130882 A1 | 10/2008 |

OTHER PUBLICATIONS

"Matching Sensors to Lenses for Better Imaging Systemg" OmniVision CRA Correction, Jun. 2009, (pp. 1-16).

* cited by examiner

*Primary Examiner* — Sinh Tran
*Assistant Examiner* — Christopher K Peterson
(74) *Attorney, Agent, or Firm* — Harrington & Smith (57) ABSTRACT

In one exemplary embodiment, a method includes: capturing, by a camera, first image data for at least one first image, where the first image data is captured with an optical image stabilizer of the camera deactivated; capturing, by the camera, second image data for at least one second image, where the second image data is captured with the optical image stabilizer of the camera activated; obtaining an optical image stabilizer correction based on a comparison between the first image data and the second image data; and applying the optical image stabilizer correction to the second image data in order to correct at least one effect of the optical image stabilizer on the second image data.

20 Claims, 7 Drawing Sheets

IMAGE CORRECTION FOR IMAGE CAPTURING WITH AN OPTICAL IMAGE STABILIZER

CROSS-REFERENCE TO RELATED APPLICATIONS

This patent application is related to commonly-assigned U.S. patent application Ser. No. 12/645,990, filed Dec. 23, 2009, which is incorporated by reference herein in its entirety.

TECHNICAL FIELD

The exemplary and non-limiting embodiments of this invention relate generally to imaging systems, methods, devices and computer programs and, more specifically, relate to lens shading correction for optical image stabilization (OIS).

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations are utilized herein:
ADC analog-digital conversion
CMOS complementary metal-oxide-semiconductor
CRA chief ray angle
DIS digital image stabilization
EIS electronic image stabilization
HDR high dynamic range
LSC lens shading correction
OIS optical image stabilization/optical image stabilizer With improvements in miniaturization, it has become common for portable electronic devices, such as mobile phones and personal digital assistants (PDAs), to include a camera for still and/or motion photography. While providing additional functionality, the portable nature of the devices and smaller size of the components lead to further issues to be addressed.

Image sensors typically receive light incident on a two-dimensional array of photosensitive pixels. Each pixel may include a number of elements including, as non-limiting examples: a lens (often called a "microlens"), a color filter that is configured to block light of one or more particular color(s) (wavelengths) from reaching the sensor, and a photosensitive element. As an example, these elements may be arranged at different physical levels relative to, of or on a substrate. Traditionally, the elements of the pixels should have their centers substantially aligned (e.g., substantially coaxial). Reference is made to US Patent Application Publication No. 2007/0030379.

Figure 1:
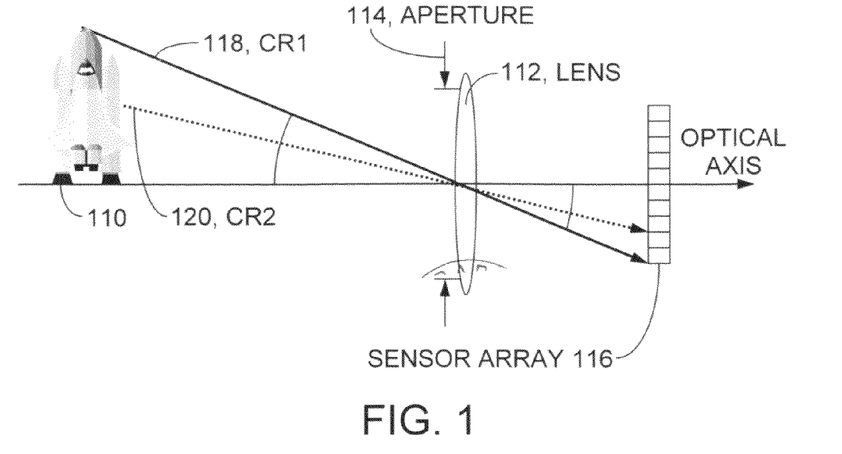
FIG. 1 shows a diagram illustrating CRA with respect to various image sensor components.

FIG. 1 shows a diagram illustrating CRA with respect to various image sensor components. Light from an object 110 is received by the device via a lens 112 and an aperture 114 in relation thereto. The light is incident on a sensor array 116 comprised of a two-dimensional array of photosensitive pixels. The sensor array 116 outputs a digital readout corresponding to the incident light as sensed by the individual pixels. The CRA is the angle of the incident rays passing through a center of the lens aperture as measured (e.g., at the image sensor) from the normal. Thus, the CRA of the incident light at a pixel corresponds to the angle of the rays as incident on the sensor array 116. As may be appreciated from FIG. 1, rays incident on the center of the sensor array 116 have a CRA of 0° (i.e., the normal; aligned with the optical axis shown in FIG. 1). The CRA typically increases for pixels that are further away from the center of the sensor array 116 with those pixels furthest from the center (e.g., at the edges of the sensor array 116) having the largest CRA. For example, CR1 118 is greater than CR2 120 and, thus, CR1 strikes a portion (e.g., a pixel) of the sensor array 116 further from the center than the portion that CR2 120 strikes.

Figure 2:
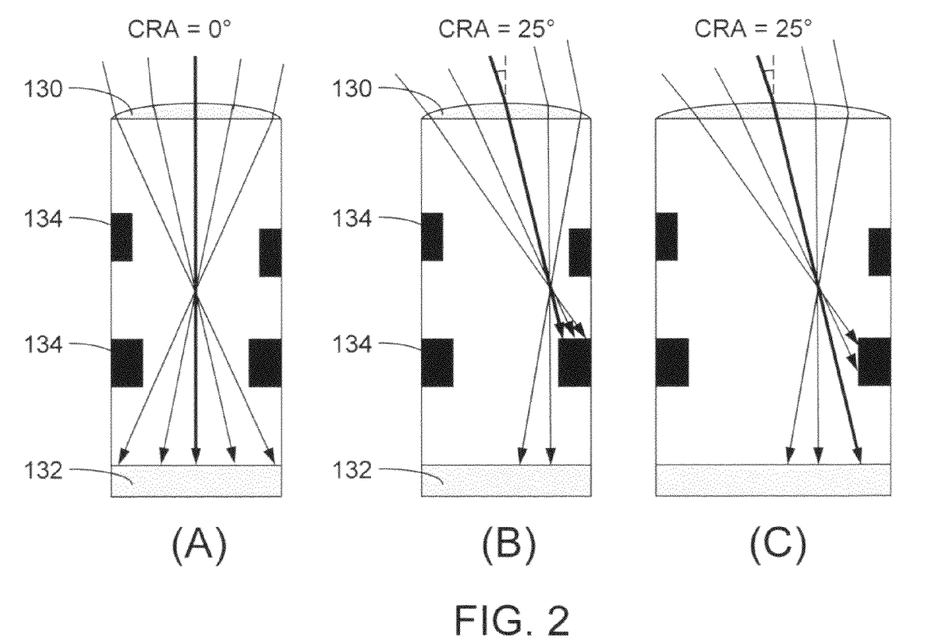
FIG. 2 shows examples of the collection of light for different CRAs.

Conventional CMOS pixels act as "photon buckets" that collect light towards the light-sensitive region at the bottom. As the CRA increases for a pixel, the light may be blocked by metal traces (e.g., along the walls—the sides of the "photon bucket") which results in reduced light collection efficiency. FIG. 2 shows examples of the collection of light for different CRAs, namely for a CRA of 0° (FIG. 2A) and a CRA of 25° (FIGS. 2B and 2C). The light is received by a microlens 130 that focuses the received light and allows it to be sensed by a light sensitive region 132. Along the sides are metal traces 134. As can be seen, for a larger CRA (e.g., a CRA of 25° as in FIG. 2B) the metal traces 134 may block some of the received light from reaching the light sensitive region 132. Thus, it is often desirable to mitigate the effect of CRA when capturing images.

It is further noted that the size of a pixel may also affect the light collection and sensing. Generally, larger pixels are less susceptible than smaller pixels to pixel efficiency reduction at higher CRAs. For example, compare the larger pixel (at a CRA of 25°) of FIG. 2C to the smaller pixel (at a CRA of 25°) of FIG. 2B. As can be seen, more light is collected (e.g., sensed) by the larger pixel since the metal traces of the wider pixel block fewer rays.

Some sensor technologies such as a back side illumination sensor, for example, may be less prone to shading caused by a large CRA. To achieve optimum image quality, microlenses and optics may be optimized so that even a large CRA can produce good image quality. Even in such cases, a larger CRA may produce more severe lens shading problems.

Another issue with portable image capturing devices (e.g., cameras, mobile devices having camera functionality) is image blurring, for example, caused by vibration. One set of techniques that may be used to combat such blurring effects are image stabilization techniques. Examples of image stabilization techniques include DIS, EIS and OIS. An OIS component detects movement and varies the optical path through the camera lens to the image sensor to reduce the blurring effect on the image. Reference in this regard may be made to EP 1 729 509 and to commonly assigned U.S. patent application Ser. No. 11/267,394 (filed Nov. 4, 2005, published as US 2007/0103555) and Ser. No. 12/080,695 (filed Apr. 3, 2008, published as US 2009/0252488).

By way of further example, descriptions are provided below for various exemplary OIS technologies.

Lens System Shift: All lenses in the camera lens system are shifted in relation to the image sensor in order to vary the optical path.

Lens Shift or Partial Lens System Correction: As compared to the lens system shift noted above, not all of the lenses in the camera lens system are shifted. Instead, there is at least one correction lens that is shifted in order to vary the optical path. In some cases, the at least one correction lens may be such that its optical power is changed in order to vary the optical path.

Lens System Tilt, Lens Tilt or Variable Prism: The lens or lens system (i.e., one or more lenses) is tilted in relation to the image sensor in order to vary the optical path. The tilting effect also can be obtained by using a variable prism in the lens system.

Sensor Shift: The image sensor is shifted in relation to the lens in order to vary the optical path.

Another issue that arises in the operation of image sensors is lens shading. Various imperfections in the optical assemble may create a shading effect on the produced image. For example, the image may be brighter in the center and decrease in brightness when approaching the edges of the sensor array. Generally, there may be a two-dimensional variation in shading across the sensor array caused by the optical elements in the assembly and the difficulties encountered in uniformly projecting an image across the field of view of the sensor array (e.g., CRA variations). Overall, shading may be caused by differences of an optimal optical path object through the optics/microlenses to the sensor as compared to the actual optical path. Various techniques may be used to correct the lens shading of the captured image, including the use of correction algorithms that apply a two-dimensional correction function in order to compensate for lens shading differences. Reference in this regard may be made to US Patent Application Publication No. 2009/0268053.

SUMMARY

The below summary section is intended to be merely exemplary and non-limiting.

In one exemplary embodiment of the invention, a method comprising: capturing, by a camera, first image data for at least one first image, where the first image data is captured with an optical image stabilizer of the camera deactivated; capturing, by the camera, second image data for at least one second image, where the second image data is captured with the optical image stabilizer of the camera activated; obtaining an optical image stabilizer correction based on a comparison between the first image data and the second image data; and applying the optical image stabilizer correction to the second image data in order to correct at least one effect of the optical image stabilizer on the second image data.

In another exemplary embodiment of the invention, a program storage device readable by a machine, tangibly embodying a program of instructions executable by the machine for performing operations, said operations comprising: capturing, by a camera, first image data for at least one first image, where the first image data is captured with an optical image stabilizer of the camera deactivated; capturing, by the camera, second image data for at least one second image, where the second image data is captured with the optical image stabilizer of the camera activated; obtaining an optical image stabilizer correction based on a comparison between the first image data and the second image data; and applying the optical image stabilizer correction to the second image data in order to correct at least one effect of the optical image stabilizer on the second image data.

In another exemplary embodiment of the invention, an apparatus comprising: a camera comprising an optical image stabilizer; at least one processor; and at least one memory including computer program code, the at least one memory and the computer program code being configured to, with the at least one processor and the camera, cause the apparatus at least to perform: capturing first image data for at least one first image, where the first image data is captured with the optical image stabilizer deactivated; capturing second image data for at least one second image, where the second image data is captured with the optical image stabilizer activated; obtaining an optical image stabilizer correction based on a comparison between the first image data and the second image data; and applying the optical image stabilizer correction to the second image data in order to correct at least one effect of the optical image stabilizer on the second image data.

In another exemplary embodiment of the invention, an apparatus comprising: first means for capturing first image data for at least one first image, where the first image data is captured with an optical image stabilizer of the first means for capturing deactivated; second means for capturing second image data for at least one second image, where the second image data is captured with an optical image stabilizer of the second means for capturing activated; means for obtaining an optical image stabilizer correction based on a comparison between the first image data and the second image data; and means for applying the optical image stabilizer correction to the second image data in order to correct at least one effect of the optical image stabilizer on the second image data.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

For modules without OIS functionality, lens shading typically can be corrected, for example, by using calibrated two-dimensional lens shading correction (e.g., a correction algorithm that applies a two-dimensional correction function or grid). However, as a result of the OIS functionality, the CRA may change for every image. This can cause problems in combination with lens shading correction as the lens shading correction is typically designed for one specific scenario with a certain CRA. Thus, typical lens shading correction cannot correct the lens shading for a module with OIS due to the shot-to-shot variations.

Figure 3:
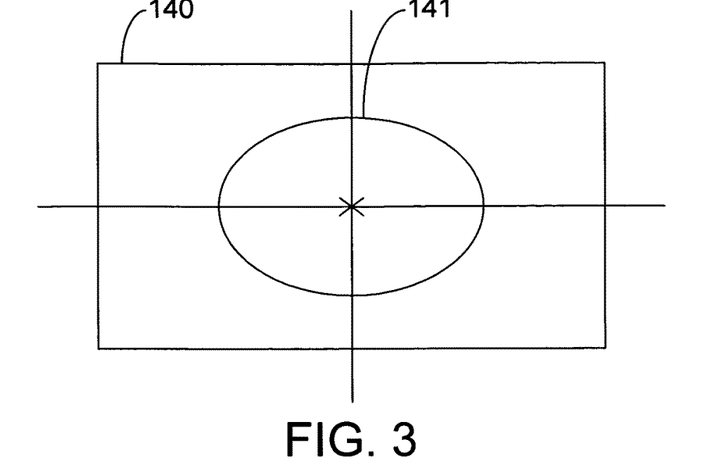
FIG. 3 illustrates an example of taking an image without OIS (OIS OFF) and without any shaking of the camera.

FIG. 3 illustrates an example of taking an image 141 without OIS (OIS OFF) and without any shaking of the camera.

The image 141 is generated by the optics towards the middle of the camera module 140. The center of the image 141 is marked with an "X."

Figure 4:
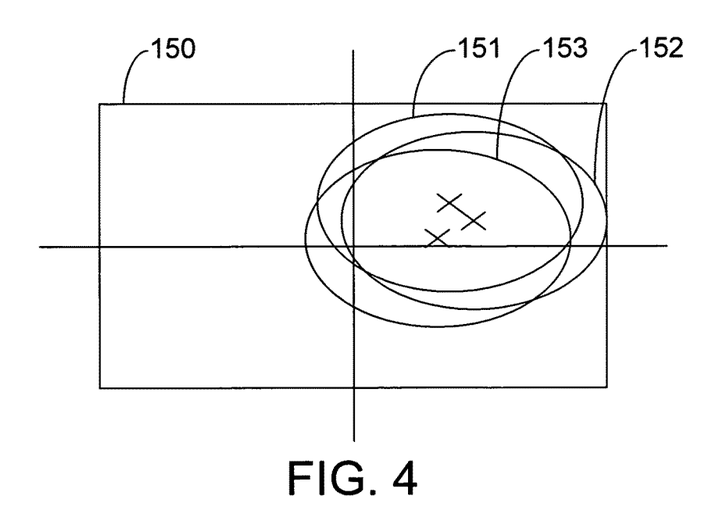
FIG. 4 illustrates examples of taking images with OIS active (OIS ON) due to shaking of the camera.

FIG. 4 illustrates examples of taking images 151, 152, 153 with OIS active (OIS ON) due to shaking of the camera. Image stabilization may be needed, for example, due to human handshake. For the images of FIG. 4 it is assumed that the lens operates off-center of the camera module 150 as a result of the OIS functionality (e.g., the OIS moving one or more of the lenses). The images 151, 152, 153 show the movement of the lens during image capture (e.g., the lens is off-center compared to the center of the camera module 150). The lens moves to a +x, +y position to correct, for example, +yaw and +pitch tilt angles caused by handshake. In such a manner the resulting image captures the same subject matter as in FIG. 3 (i.e., without human handshake) due to the OIS functionality.

It is likely that the OIS functionality will cause different lens shading. Since the OIS may operate on a per-image basis (e.g., differently on each image captured depending on the movement sensed at that time and for that image), the lens shading may be different from picture to picture, for example, as the CRA changes. This can lead to big differences in image quality, even among pictures that are taken consecutively. Furthermore, differences in module production (i.e., module to module) can contribute to these image quality differences in the captured images.

One technique for accounting for the module-to-module variations involves applying an inverse calibration grid (e.g., based on a two-dimensional correction function or the inverse of such a function). The camera includes at least one typical grid (e.g., at least two grids for at least two color temperatures) that is generated based on evaluations of the modules from flat field images (e.g., generated by the camera manufacturer or assembler and downloaded to the camera; generated as part of camera calibration for the individual camera).

Figure 5:
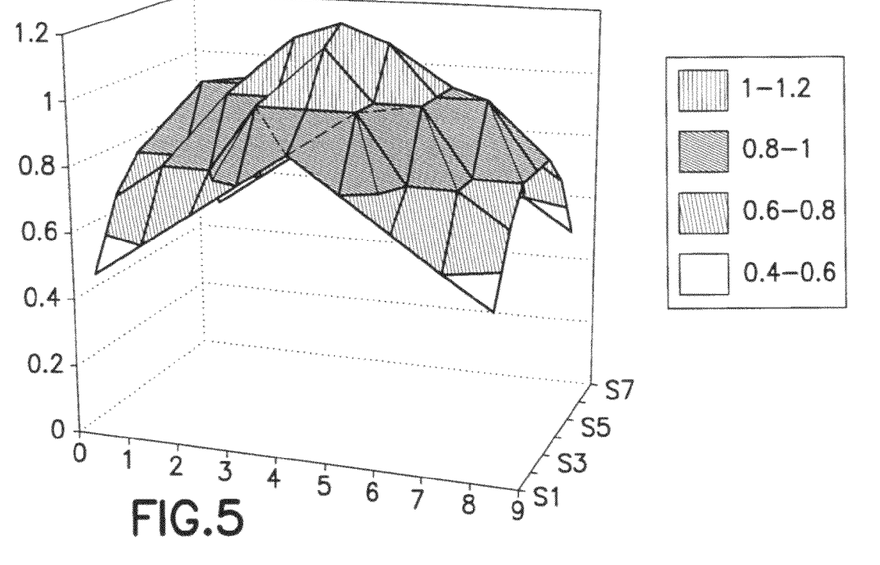
FIG. 5 shows an example of a calibration grid for 1 channel.

A calibration grid may be included (e.g., stored) in the module memory for use with the camera. As a non-limiting example, the calibration grid may be 9×7 for 3-4 channels. FIG. 5 shows an example of a calibration grid for 1 channel. In some exemplary embodiments, several calibration grids are available for use with a suitable grid being selected based on the color temperature and/or interpolation(s) between the calibrated grids based on color temperature.

Figure 6:
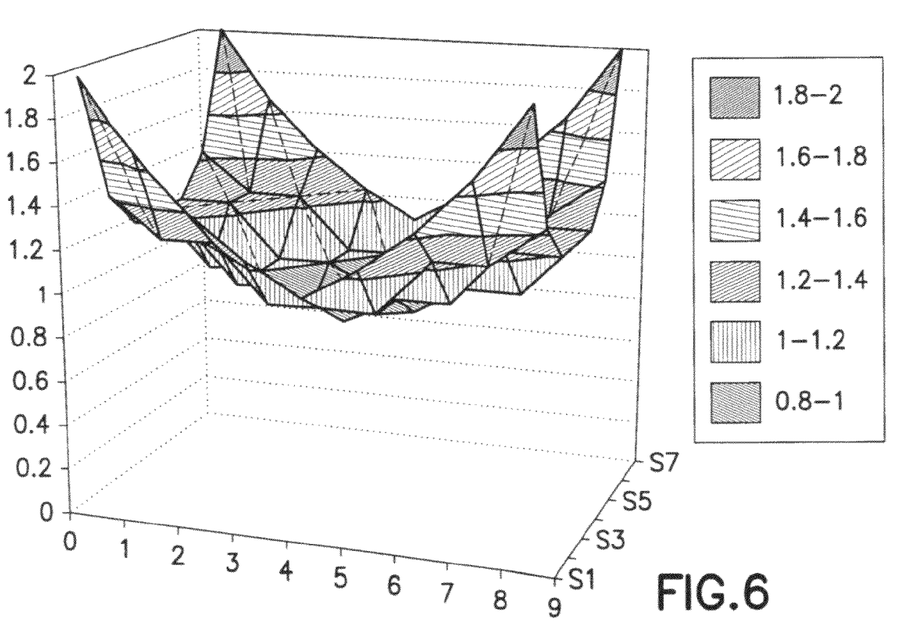
FIG. 6 shows an example of an inverse calibration grid for 1 channel corresponding to the calibration grid of FIG. 5.

The (selected) calibration grid is inversed, integrated to a bigger size (e.g., 60×40) and multiplied with the typical grid to obtain a correction grid. The correction grid is used to correct the captured image and account for module-specific variation. FIG. 6 shows an example of an inverse calibration grid for 1 channel (e.g., corresponding to the calibration grid of FIG. 5).

Figure 7:
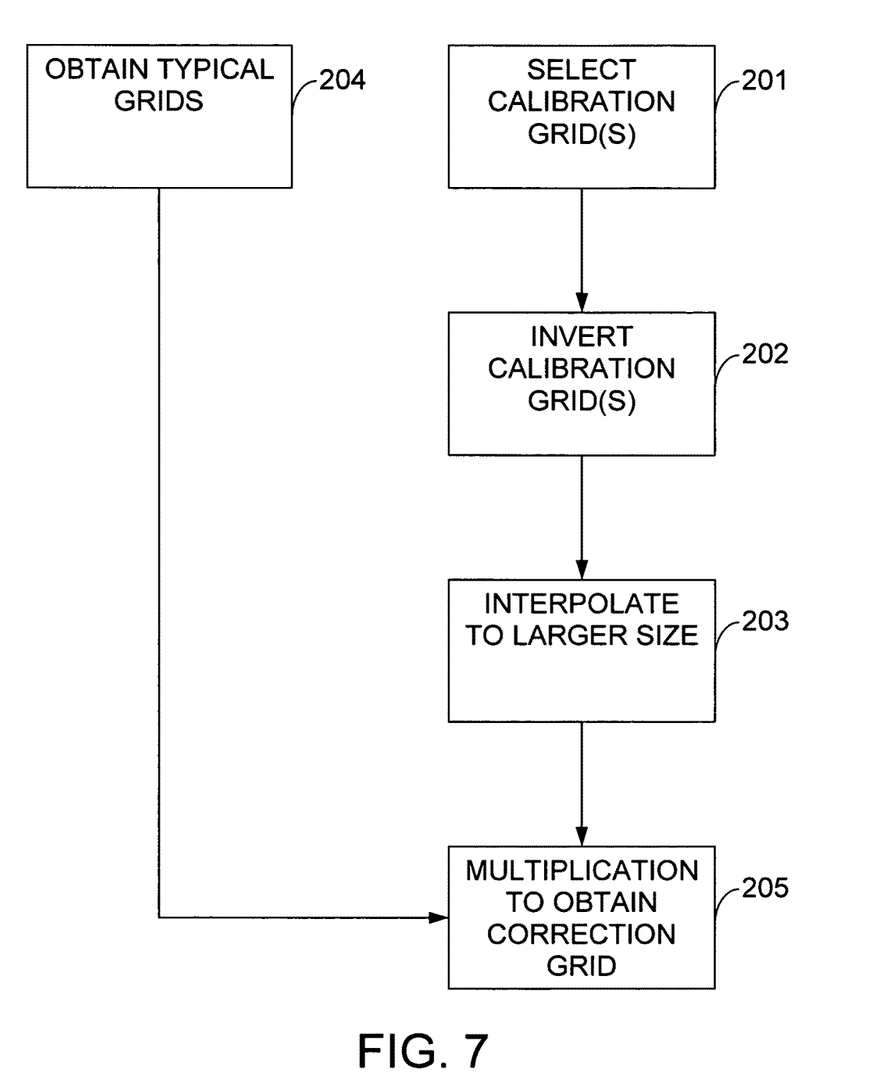
FIG. 7 depicts a flowchart illustrating one non-limiting example of a method for utilizing the calibration grid of FIG. 5 and the inverse calibration grid of FIG. 6.

FIG. 7 depicts a flowchart illustrating one non-limiting example of a method for utilizing the calibration grid of FIG. 5 and the inverse calibration grid of FIG. 6 (i.e., the above-described grids). In 201, the calibration grid(s) is selected (e.g., based on color temperature). In 202, the selected calibration grid(s) is inverted. In 203, the inverse calibration grid(s) is interpolated to a larger size. In 204, the typical grids are obtained (e.g., retrieved from storage/memory). In 205, the inverse calibration grid(s) is multiplied by the typical grids to obtain a correction grid that includes module-specific corrections (e.g., a module-specific correction grid). The module-specific correction grid is then applied to the images (i.e., image data) that are captured. The process depicted in FIG. 7 is not performed for each picture taken since the typical grids and calibration grid(s) do not vary from picture to picture. As such, there is no need to repeat the process of FIG. 7 on a per-shot basis.

The exemplary embodiments of the invention utilize at least one additional (run time) calibration stage to account for OIS-based changes (e.g., lens shading). For example, in some exemplary embodiments a reference image is captured before or after the desired image. The reference image is captured without OIS (OIS OFF). The desired image is captured with OIS active (OIS ON). By comparing the reference image (OIS OFF) to the desired image (OIS ON), the reference image can be utilized to detect changes (e.g., lens shading, distortion) caused by the OIS.

The OIS calibration grid (ratio grid) may be interpolated to the OIS correction grid size. The final correction grid may then be achieved by multiplying the module-specific correction grid (e.g., obtained as shown in FIG. 7) with the OIS correction grid.

In some further exemplary embodiments, a ratio of OIS OFF/OIS ON images is calculated for each OIS calibration grid point. If the ratio for a point is too different from a neighboring point (e.g., exceeds a threshold or percentage difference), the point can be discarded. In such a case, it may be desirable to interpolate the point from the neighboring points. It may be desirable to ensure that the OIS calibration grid is large enough to support such functionality (e.g., interpolation, replacement of outliers/outlying points). With this approach, it is possible, for example, to avoid changes (e.g., blurring) caused by moving objects. In other exemplary embodiments, moving targets in images are analyzed and those OIS calibration grid points that are affected are replaced, for example, by interpolating from the neighboring points.

Figure 8:
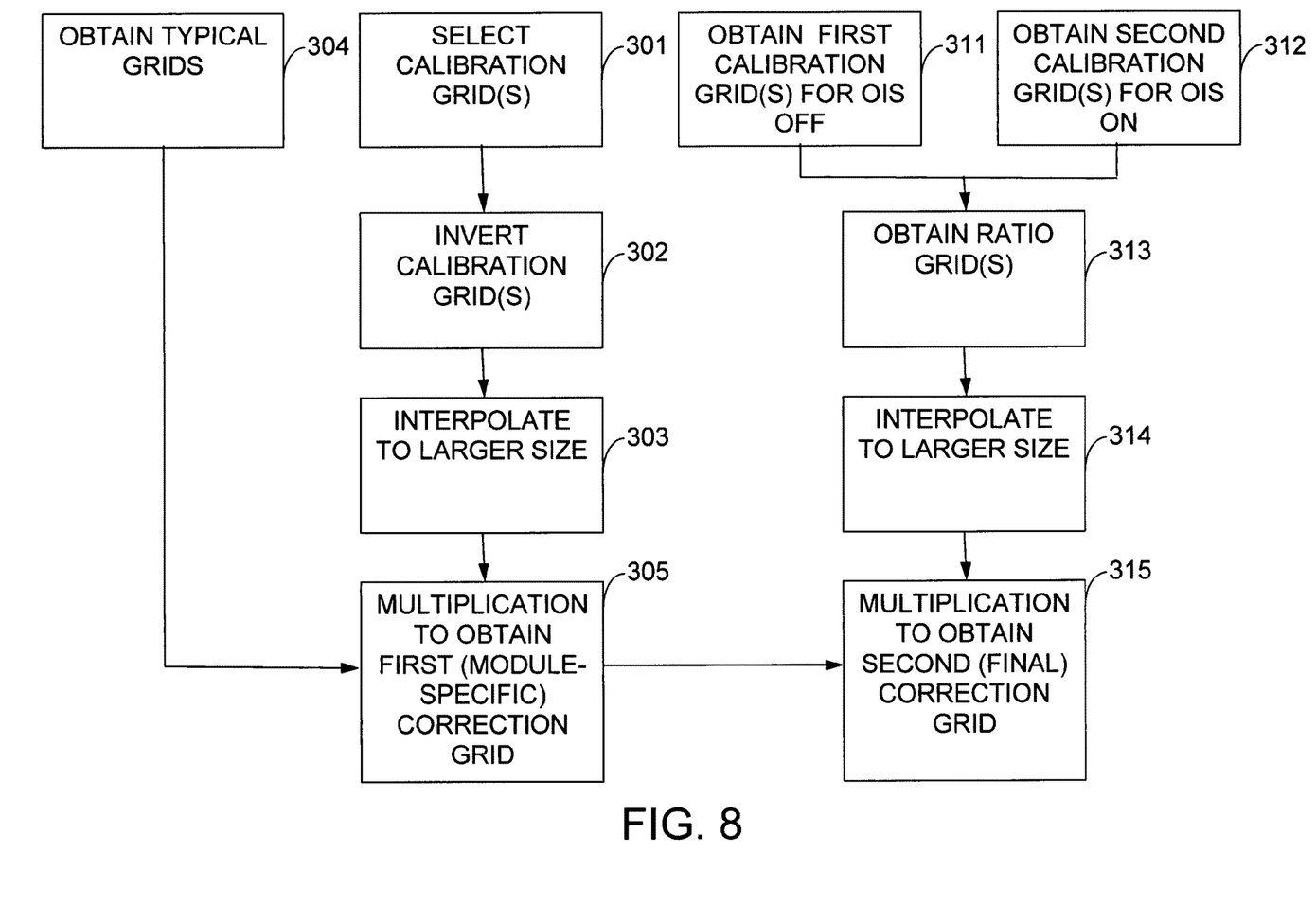
FIG. 8 depicts a flowchart illustrating one non-limiting example of a method, a computer program and operation of a device for practicing the exemplary embodiments of this invention.

FIG. 8 depicts a flowchart illustrating one non-limiting example of a method, a computer program and operation of a device for practicing the exemplary embodiments of this invention.

In 301, the calibration grid(s) is selected (e.g., based on color temperature). In 302, the selected calibration grid(s) is inverted. In 303, the inverse calibration grid(s) is interpolated to a larger size. In 304, the typical grids are obtained (e.g., retrieved from storage/memory). In 305, the inverse calibration grid(s) is multiplied by the typical grids to obtain a first correction grid that includes module-specific corrections (e.g., a module-specific correction grid).

In 311, a first calibration grid(s) is obtained for OIS OFF (e.g., based on an image captured without OIS). In 312, a second calibration grid(s) is obtained for OIS ON (e.g., based on a desired image captured with OIS active). In 313, a ratio grid(s) is obtained by comparing the first calibration grid(s) with the second calibration grid(s) in order to determine the differences (e.g., color shading change due to changing CRA) caused by the OIS being active. In 314, the obtained ratio grid(s) is interpolated to a larger size. In 315, the larger ratio grid(s) is multiplied by the first (module-specific) correction grid to obtain a second (final) correction grid. The second correction grid is then applied at least to the desired image (i.e., image data) that was captured (e.g., as part of step 312).

As a non-limiting example, the ratio grid may be obtained (step 313) as follows. Within each LSC grid area, an average is calculated, for example, to remove the effect of noise. For each color channel (e.g., red, blue, green blue, green red), one may calculate an average of 32×32 pixels and this value would be used as the value for that grid area. It may be beneficial to remove pedestal from the calculation values (i.e., to take into account the black level of the image, for example, by considering any value under 64 to be zero in a 10-bit ADC system).

It should be noted that the multiplication steps (305 and 315) are by way of example. In some exemplary embodiments, if the grids are chosen correctly a simple multiplication may be used. In some exemplary embodiments, it may be desirable to round the results of such multiplication. However, if the grids are selected differently and/or if some of the grids are inverse grids, for example, division may be used instead or in addition to the multiplication. One of ordinary skill in the art will appreciate the various arrangements and techniques for combining grids and applying more than one grid to image data.

In some exemplary embodiments, the order of operations is different from the example shown in FIG. 8. As an example, the order of operations and/or usage of various operations may depend on the particular grids in use. For example, step 314 may not be needed and/or an interpolation step (similar to step 314, for example) may be present between steps 304 and 305. As further examples, step 304 may not be needed and/or an interpolation step (similar to step 314, for example) may be present after step 315. One or ordinary skill in the art will appreciate the various operations and different arrangements of steps for performing the various operations of inverting, interpolating and multiplying.

In some exemplary embodiments, the method of FIG. 8 further includes one or more of the above-noted interpolation aspects (e.g., interpolating a point from its neighboring points) as applied to one or more points of data, for example, that are determined to be outliers. This additional functionality may comprise additional steps or aspects of one or more of steps 313 and 314, as non-limiting examples. In other exemplary embodiments, interpolation may not be needed, for example, if the grid sizes are chosen differently. The above descriptions with respect to interpolation are provided by way of example and not in limitation of the exemplary embodiments of the invention.

In some exemplary embodiments, the grid size of the ratio grid should be large enough to ensure a sufficient quantity (e.g., density) of points such that: (1) outliers can be classified as such; and (2) outliers can be discarded and replacement points interpolated from one or more neighboring (e.g., nearby) points. If there is an insufficient number of data points for the ratio grid, it may not be possible to classify outliers and/or replace them with interpolated points.

While described above in FIGS. 7 and 8 as including a step for inverting the calibration grid(s) (steps 202, 302), in other exemplary embodiments the stored calibration grid(s) is already inverted and no additional inversion step is included.

In some exemplary embodiments, the above-described techniques may be applied to video capturing. As an example, in video capturing the reference image (e.g., the first calibration grid for OIS OFF) may be used for more than one OIS active (OIS ON) frame. As a further example, the reference image may be used until one or more triggers (e.g., events, characteristics, comparisons, qualities, qualifications) occur. As non-limiting examples, the one or more triggers may include: reaching a certain time duration (e.g., expiration of a timer), the shading changing by a certain (e.g., predetermined) amount (e.g., based on a ratio between frames) or the lens position changing too much. In some exemplary embodiments, the application to video may perform adequately if the shading changes are not too severe.

In some exemplary embodiments, more than one reference image is captured and/or used. As non-limiting examples, at least two reference images may be used (e.g., at least a first reference image and a second reference image). For example, a first reference image may be captured before the desired image and a second reference image may be captured after the desired image. In other exemplary embodiments, the first and second reference images are captured sequentially before the desired image. In further exemplary embodiments, the first and second reference images are captured sequentially after the desired image. In other exemplary embodiments, the first reference image is not sequential (before or after) with the desired image while the second reference image is sequential (before or after) with the desired image. In such a manner, the first reference image may be used for more than one desired image while the second reference image is specific to a single desired image (e.g., the one with which it is sequential). In further exemplary embodiments, more than two reference images may be used. It should be appreciated that any suitable number and/or arrangement (e.g., with respect to the desired image) of reference images may be utilized in conjunction with the exemplary embodiments of the invention.

In other exemplary embodiments, downscaled reference images (e.g., binned images) are used instead of full resolution reference images. This would reduce latencies and memory consumption.

In some exemplary embodiments, to reduce latencies the camera automatically calculates the calibration grid. In such a manner, there may be no need to send the whole image and, instead, grid values could be provided. This may be particularly beneficial if the interface or memory is slow or if there is an insufficient amount of memory (e.g., for a full reference image).

In some exemplary embodiments, it may be desirable to align the reference image(s) (OIS OFF) and the desired image(s) (OIS ON). Known alignment techniques may be used. One of ordinary skill in the art will appreciate the inclusion/application of such known alignment techniques and their usage in conjunction with the exemplary embodiments of the invention.

In further exemplary embodiments, flash may be used. As a non-limiting example, the usage of flash for the reference image(s) (e.g., flash on or flash off) may dictate or may be parallel to the usage of flash in capturing the desired image(s). For example, if the reference/desired image is captured with/without flash, then the desired/reference image correspondingly is captured with/without flash. In some exemplary embodiments, such parallel operation of flash may be automatic (e.g., with HDR imaging).

In another exemplary embodiment, a method proceeds as follows. Capture the reference image. Capture the target/desired image. Align the images. Calculate LSC grid values for both images. While averaging may be enough, one may also use additional techniques, such as applying a low pass filter at least for the target image (e.g., for the aligned images) so that sharp values do not have as great an effect. Calculate the ratio for each LSC grid area, for example, by dividing the value for LSC grid areas of the reference image by the value for LSC grid areas of the target image (e.g., step 313 in FIG. 8). If some values are too far removed (e.g., outliers), one may wish to further apply one or more techniques to reduce or remove the effect of these outliers (e.g., the interpolation techniques noted herein). After the above operations, one may proceed with steps 314 and 315 as described above with respect to FIG. 8.

In another exemplary embodiment, a method proceeds as follows. (1) Capture the reference image. (2) Capture the target image. (3) Align the images; filter the image data; and/or remove the effects of movement (e.g., OIS) and/or other possible problems from the images (e.g., if needed or if desired). (4) Calculate ratios. (5) Use the ratios to adjust the lens shading correction (e.g., adjust the lens shading correction grid or adjust the lens shading correction technique/method, for example, if grid-based correction is not used). (6) Change the grid size or modify the ratio information (e.g., if grid-based correction is not used) to account for the size of the correction. This modification may depend on the particular implementation in use, as a non-limiting example. (7) Use the correction (e.g., apply it to the target image).

In other exemplary embodiments, step (6) is performed before or during step (5), as non-limiting examples.

The exemplary embodiments of the invention may provide a number of advantages. The following are presented as non-limiting examples, and not in limitation of the exemplary embodiments of the invention. The exemplary embodiments may work robustly with very severe shading changes, and/or with different OIS technologies (i.e., the exemplary embodiments are not specific to any particular form of OIS). The exemplary embodiments are easy to implement. While additional latencies may be introduced to the system, the resulting improved image quality more than offsets any such latencies.

Figure 9:
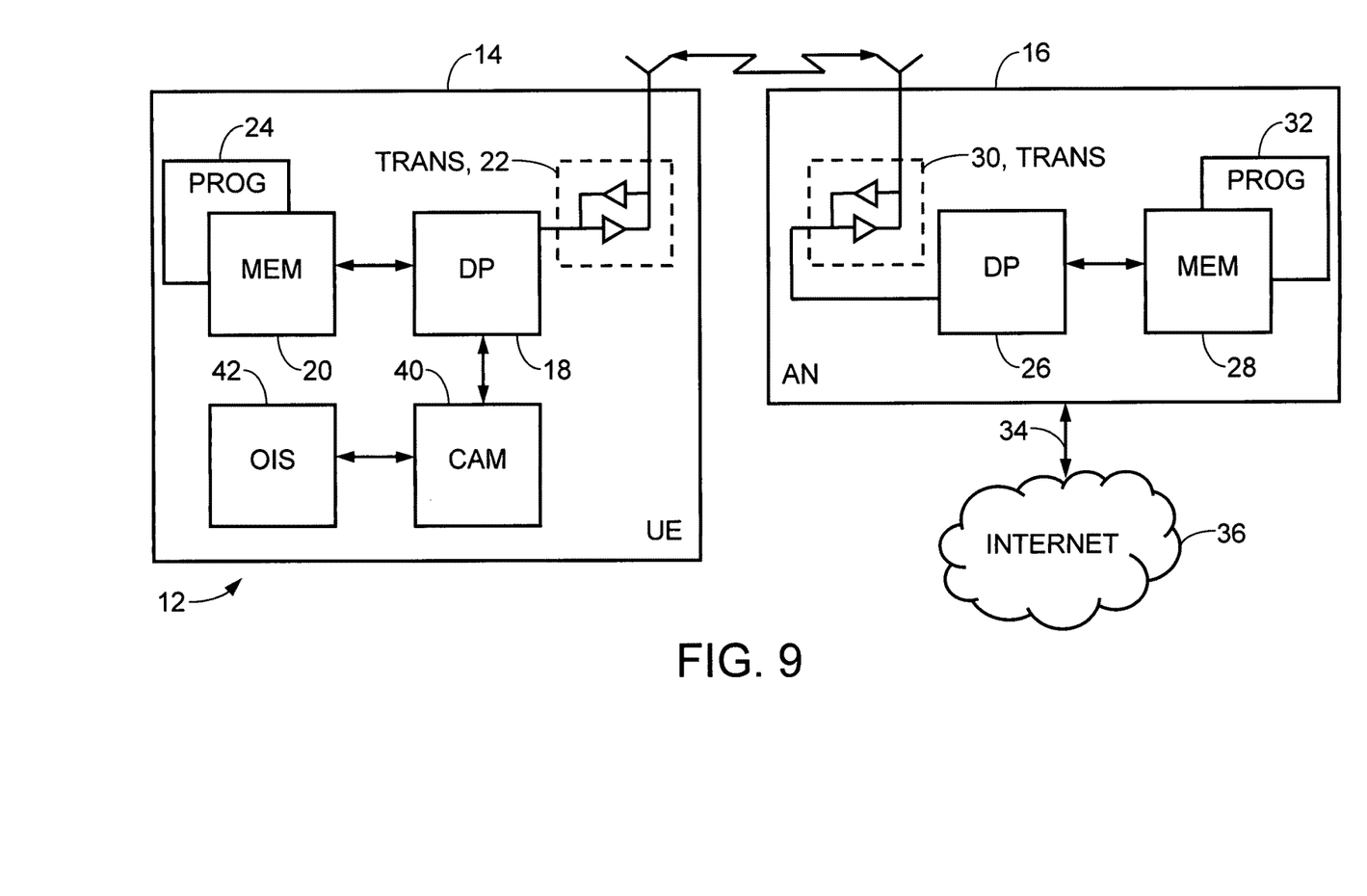
FIG. 9 illustrates a simplified block diagram of various electronic devices that are suitable for use in practicing the exemplary embodiments of this invention.

Reference is made to FIG. 9 for illustrating a simplified block diagram of various electronic devices that are suitable for use in practicing the exemplary embodiments of this invention. In FIG. 9, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has (e.g., is coupled to) at least one antenna to facilitate communication.

The UE 14 also includes a camera module (CAM) 40 coupled to the DP 18 and an OIS module (OIS) 42 coupled to the CAM 40. The CAM 40 enables capturing of image data for at least still images. In some exemplary embodiments, the CAM 40 also or instead enables video capturing (i.e., image data for video). The image data that is obtained by the CAM 40 may be stored on the MEM 20. In other exemplary embodiments, the UE 14 includes one or more additional storage components (e.g., memories) including a separate memory (e.g., a flash card) in which the captured image data is stored. The OIS 42 improves the quality of the captured images, for example, by sensing movement of the UE 14 (e.g., during image capture) and compensating for the sensed movement (e.g., by moving one or more components of the CAM 40 as described herein). In some exemplary embodiments, the OIS 42 may be coupled to the DP 18, for example, in order to enable reconfiguration of the OIS 42. In some exemplary embodiments, the CAM 40 may comprise the OIS 42. In other exemplary embodiments, the CAM 40 may be coupled directly to the MEM 20. In some exemplary embodiments, the CAM 40 may comprise at least one lens, at least one filter and/or at least one sensor array (e.g., an array of photosensitive elements or pixels, for example, embodied in or on a substrate or embodied as a semiconductor structure).

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for wireless communication with the UE 14. Note that the TRANS 30 has (e.g., is coupled to) at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP 18, 26, enable the respective electronic device to operate in accordance with the exemplary embodiments of this invention, as discussed herein.

In general, the various exemplary embodiments of the UE 14 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. In other exemplary embodiments, the UE 14 may comprise a fixed electronic device, such as a desktop computer having a camera or an attached image capturing component (e.g., a webcam), for example.

The exemplary embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

While described above in reference to memories (MEMS 20, 28), these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to data processors (DPs 18, 26), these components may generally be seen to correspond to processors, processing devices, processing components, processing blocks, circuits, circuit devices, circuit components, circuit blocks, integrated circuits and/or chips (e.g., chips comprising one or more circuits or integrated circuits).

While described above as including various wireless communication components, in other exemplary embodiments the UE 14 does not include the TRANS 22 and is not configured for wireless communication with the AN 16. For example, the UE 14 may be embodied in a fixed or portable camera (e.g., as opposed to a mobile phone that includes a camera). As another example, the UE 14 instead may include one or more wired communication components.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 10:
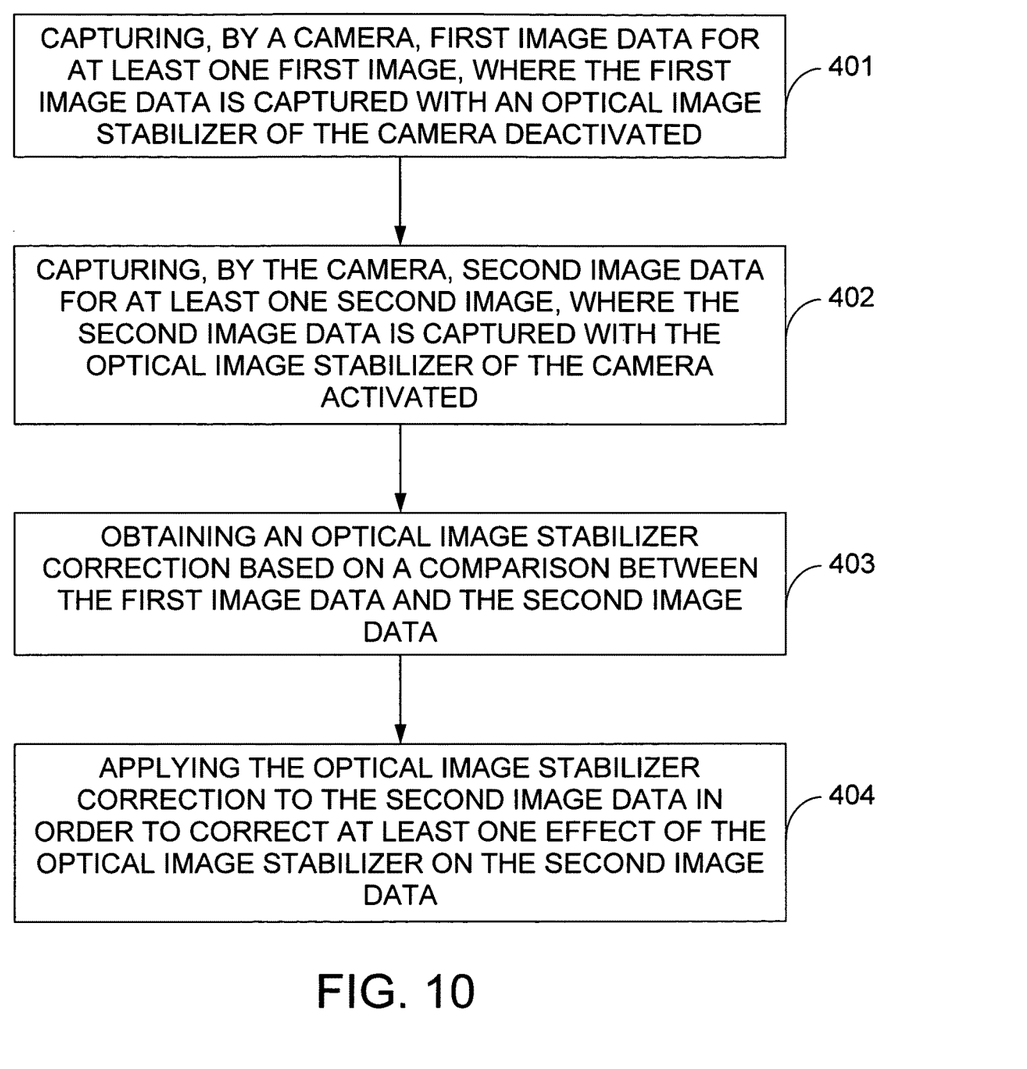
FIG. 10 depicts a flowchart illustrating another non-limiting example of a method, a computer program and operation of a device for practicing the exemplary embodiments of this invention.

(1) In one exemplary embodiment, and with reference to FIG. 10, a method comprising: capturing, by a camera, first image data for at least one first image, where the first image data is captured with an optical image stabilizer of the camera deactivated (401); capturing, by the camera, second image data for at least one second image, where the second image data is captured with the optical image stabilizer of the camera activated (402); obtaining an optical image stabilizer correction based on a comparison between the first image data and the second image data (403); and applying the optical image stabilizer correction to the second image data in order to correct at least one effect of the optical image stabilizer on the second image data (404).

A method as above, where the first image data is captured before the second image data. A method as in any above, where the first image data is captured after the second image data. A method as in any above, where the first image data further comprises third image data for a third image, where the first image data is captured before the second image data and the third image data is captured after the second image data, where the optical image stabilizer correction is obtained based on a comparison between the first image data, the second image data and the third image data. A method as in any above, where the first image data and the second image data are captured sequentially. A method as in any above, where the first image data and the second image data are both captured with flash or are both captured without flash. A method as in any above, where applying the optical image stabilizer correction to the second image data comprises multiplying the second image data by a total correction that is at least in part based on the optical image stabilizer correction. A method as in any above, where the optical image stabilizer detects movement of the camera and varies an optical path through a lens of the camera to an image sensor of the camera (e.g., by changing a position of the lens in relation to the camera).

A method as in any above, further comprising: discarding at least one outlying point of data from the optical image stabilizer correction. A method as in any above, further comprising: replacing at least one point of data from the optical image stabilizer correction with interpolated data. A method as in any above, where the replaced at least one point of data comprises at least one outlying point of data. A method as in any above, where the interpolated data is based on at least one other point of data from the optical image stabilizer correction. A method as in any above, where the at least one other point of data is neighboring or near to the replaced at least one point of data. A method as in any above, further comprising: analyzing at least one moving target in the at least one second image; and replacing at least one point of data from the optical image stabilizer correction with interpolated data, where the replaced at least one point of data comprises at least one calibration point that is affected (e.g., blurred) by the at least one moving target.

A method as in any above, further comprising: interpolating the optical image stabilizer correction to a larger size. A method as in any above, further comprising: multiplying the optical image stabilizer correction with at least one other correction. A method as in any above, further comprising: multiplying the optical image stabilizer correction with at least one other correction prior to applying the optical image stabilizer correction to the second image data. A method as in any above, where the at least one other correction comprises a module-specific correction. A method as in any above, further comprising: selecting a calibration; inverting the selected calibration; interpolating the inverted calibration to a larger size; and multiplying the interpolated inverted calibration by a typical correction to obtain a first correction that comprises the module-specific correction. A method as in any above, further comprising: multiplying the optical image stabilizer correction by the first correction to obtain a total correction, where applying the optical image stabilizer correction to the second image data comprises multiplying the second image data by the total correction.

A method as in any above, where the at least one second image comprises a plurality of images. A method as in any above, where the at least one second image comprises a series of images arranged as a video. A method as in any above, where capturing the second image data comprises video capturing. A method as in any above, where the first image data is used for obtaining the optical image stabilizer correction until at least one triggering event. A method as in any above, where the at least one triggering event is based on at least one of: a certain time duration, shading of the second image data changing by a certain amount or percentage and a lens position of the camera changing by a certain amount or percentage.

A method as in any above, where the first image data comprises downscaled reference image data. A method as in any above, where the optical image stabilizer correction is obtained automatically by the camera. A method as in any above, where the optical image stabilizer correction consists of grid values. A method as in any above, where the first image data is not stored by the camera after the optical image stabilizer correction is obtained. A method as in any above, where the first image data is not used to obtain a second optical image stabilizer correction corresponding to third image data for at least one third image. A method as in any above, where the first image data is only used to obtain the optical image stabilizer correction for the second image data.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

A method as in any above, further comprising one or more aspects of the exemplary embodiments of the invention as described in further detail herein.

(2) In another exemplary embodiment, a program storage device readable by a machine, tangibly embodying a program of instructions executable by the machine for performing operations, said operations comprising: capturing, by a camera, first image data for at least one first image, where the first image data is captured with an optical image stabilizer of the camera deactivated (401); capturing, by the camera, second image data for at least one second image, where the second image data is captured with the optical image stabilizer of the camera activated (402); obtaining an optical image stabilizer correction based on a comparison between the first image data and the second image data (403); and applying the optical image stabilizer correction to the second image data in order to correct at least one effect of the optical image stabilizer on the second image data (404).

A program storage device as in any above, wherein the program storage device comprises a computer-readable medium, a computer-readable memory, a memory, a memory card, a removable memory, a storage device, a storage component and/or a storage circuit.

A program storage device as in any above, further comprising one or more aspects of the exemplary embodiments of the invention as described in further detail herein.

(3) In another exemplary embodiment, an apparatus comprising: a camera comprising an optical image stabilizer; at least one processor; and at least one memory including computer program code, the at least one memory and the computer program code being configured to, with the at least one processor and the camera, cause the apparatus at least to perform: capturing first image data for at least one first image, where the first image data is captured with the optical image stabilizer deactivated; capturing second image data for at least one second image, where the second image data is captured with the optical image stabilizer activated; obtaining an optical image stabilizer correction based on a comparison between the first image data and the second image data; and applying the optical image stabilizer correction to the second image data in order to correct at least one effect of the optical image stabilizer on the second image data.

An apparatus as in any above, where the apparatus comprises a mobile device, a mobile station, a mobile node, a portable electronic device, a personal digital assistant, a mobile phone, a cellular phone or a camera. An apparatus as in any above, further comprising one or more aspects of the exemplary embodiments of the invention as described in further detail herein.

(4) In another exemplary embodiment, an apparatus comprising: first means for capturing first image data for at least one first image, where the first image data is captured with an optical image stabilizer of the first means for capturing deactivated; second means for capturing second image data for at least one second image, where the second image data is captured with an optical image stabilizer of the second means for capturing activated; means for obtaining an optical image stabilizer correction based on a comparison between the first image data and the second image data; and means for applying the optical image stabilizer correction to the second image data in order to correct at least one effect of the optical image stabilizer on the second image data.

An apparatus as above, where the first means for capturing comprises a first camera, the second means for capturing comprises a second camera, the means for obtaining comprises a first processor and the means for applying comprises a second processor. An apparatus as in any above, where the first means for capturing comprises the second means for capturing. An apparatus as in any above, where the means for obtaining comprises the means for applying. An apparatus as in any above, where the first means for capturing and the second means for capturing comprise at least one camera and where the means for obtaining and the means for applying comprise at least one processor.

An apparatus as in any above, where the means for applying the optical image stabilizer correction to the second image data is further for multiplying the second image data by a total correction that is at least in part based on the optical image stabilizer correction. An apparatus as in any above, where the first image data and the second image data are captured sequentially by the first means for capturing and the second means for capturing. An apparatus as in any above, further comprising: means for replacing at least one point of data from the optical image stabilizer correction with interpolated data. An apparatus as in any above, further comprising: means for multiplying the optical image stabilizer correction with at least one other correction prior to applying the optical image stabilizer correction to the second image data, where the at least one other correction comprises a module-specific correction. An apparatus as in any above, further comprising one or more aspects of the exemplary embodiments of the invention as described in further detail herein.

(5) In another exemplary embodiment, an apparatus comprising: first capture circuitry configured to capture first image data for at least one first image, where the first image data is captured with an optical image stabilizer of the first capture circuitry deactivated; second capture circuitry configured to capture second image data for at least one second image, where the second image data is captured with an optical image stabilizer of the second capture circuitry activated; comparison circuitry configured to obtain an optical image stabilizer correction based on a comparison between the first image data and the second image data; and correction circuitry configured to apply the optical image stabilizer correction to the second image data in order to correct at least one effect of the optical image stabilizer on the second image data.

An apparatus as in any above, further comprising one or more aspects of the exemplary embodiments of the invention as described in further detail herein.

(6) In another exemplary embodiment, an apparatus comprising: a camera comprising an optical image stabilizer, where the camera is configured to capture first image data for at least one first image, where the first image data is captured by the camera with the optical image stabilizer deactivated, where the camera is further configured to capture second image data for at least one second image, where the second image data is captured with the optical image stabilizer activated; and at least one processor configured to obtain an optical image stabilizer correction based on a comparison between the first image data and the second image data and to apply the optical image stabilizer correction to the second image data in order to correct at least one effect of the optical image stabilizer on the second image data.

An apparatus as in any above, further comprising one or more aspects of the exemplary embodiments of the invention as described in further detail herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The various blocks shown in FIGS. 7, 8 and 10 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 7, 8 and 10 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 8 and 10 should be considered merely exemplary and non-limiting. It should be appreciated that the blocks depicted in FIGS. 8 and 10 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 8 and 10 so as to implement one or more further exemplary embodiments of the invention, such as those described in further detail herein.

That is, the non-limiting, exemplary embodiments of the invention shown in FIGS. 8 and 10 may be implemented, practiced or utilized in conjunction with one or more further aspects in any combination (e.g., any combination that is practicable, suitable and/or feasible) and are not limited only to the blocks, steps, functions and/or operations illustrated in FIGS. 8 and 10.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

It should further be noted that any and all references herein to a particular number of lenses are not in limitation but rather by way of example, and a different number and/or arrangement of lenses may be utilized. Generally, such references may be seen as corresponding to the presence of at least one lens or microlens that may or may not form a component of a lens/microlens system.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components. As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
   capturing, by a camera, first image data for at least one first image, where the first image data is captured with an optical image stabilizer of the camera deactivated;
   capturing, by the camera, second image data for at least one second image, where the second image data is captured with the optical image stabilizer of the camera activated;
   obtaining an optical image stabilizer correction based on a comparison between the first image data and the second image data; and
   applying the optical image stabilizer correction to the second image data in order to correct at least one effect of the optical image stabilizer on the second image data.

2. The method of claim 1, where applying the optical image stabilizer correction to the second image data comprises multiplying the second image data by a total correction that is at least in part based on the optical image stabilizer correction.

3. The method of claim 1, where the first image data and the second image data are captured sequentially.

4. The method of claim 1, further comprising: replacing at least one point of data from the optical image stabilizer correction with interpolated data.

5. The method of claim 1, further comprising: multiplying the optical image stabilizer correction with at least one other correction prior to applying the optical image stabilizer correction to the second image data, where the at least one other correction comprises a module-specific correction.

6. The method of claim 1, further comprising: selecting a calibration; inverting the selected calibration; interpolating the inverted calibration to a larger size; multiplying the interpolated inverted calibration by a typical correction to obtain a first correction that comprises a module-specific correction; and multiplying the optical image stabilizer correction by the first correction to obtain a total correction, where applying the optical image stabilizer correction to the second image data comprises multiplying the second image data by the total correction.

7. A non-transitory program storage device readable by a machine, tangibly embodying a program of instructions executable by the machine for performing operations, said operations comprising:
  capturing, by a camera, first image data for at least one first image, where the first image data is captured with an optical image stabilizer of the camera deactivated;
  capturing, by the camera, second image data for at least one second image, where the second image data is captured with the optical image stabilizer of the camera activated;
  obtaining an optical image stabilizer correction based on a comparison between the first image data and the second image data; and
  applying the optical image stabilizer correction to the second image data in order to correct at least one effect of the optical image stabilizer on the second image data.

8. The program storage device of claim 7, where applying the optical image stabilizer correction to the second image data comprises multiplying the second image data by a total correction that is at least in part based on the optical image stabilizer correction.

9. The program storage device of claim 7, where the first image data and the second image data are captured sequentially.

10. The program storage device of claim 7, the operations further comprising:
  replacing at least one point of data from the optical image stabilizer correction with interpolated data.

11. The program storage device of claim 7, the operations further comprising: multiplying the optical image stabilizer correction with at least one other correction prior to applying the optical image stabilizer correction to the second image data, where the at least one other correction comprises a module-specific correction.

12. An apparatus comprising:
  a camera comprising an optical image stabilizer;
  at least one processor; and
  at least one memory including computer program code, the at least one memory and the computer program code being configured to, with the at least one processor and the camera, cause the apparatus at least to perform: capturing first image data for at least one first image, where the first image data is captured with the optical image stabilizer deactivated; capturing second image data for at least one second image, where the second image data is captured with the optical image stabilizer activated; obtaining an optical image stabilizer correction based on a comparison between the first image data and the second image data; and applying the optical image stabilizer correction to the second image data in order to correct at least one effect of the optical image stabilizer on the second image data.

13. The apparatus of claim 12, where applying the optical image stabilizer correction to the second image data comprises multiplying the second image data by a total correction that is at least in part based on the optical image stabilizer correction.

14. The apparatus of claim 12, where the first image data and the second image data are captured sequentially.

15. The apparatus of claim 12, where the at least one memory and the computer program code are configured to, with the at least one processor and the camera, cause the apparatus at least to further perform: replacing at least one point of data from the optical image stabilizer correction with interpolated data.

16. The apparatus of claim 12, where the at least one memory and the computer program code are configured to, with the at least one processor and the camera, cause the apparatus at least to further perform: multiplying the optical image stabilizer correction with at least one other correction prior to applying the optical image stabilizer correction to the second image data, where the at least one other correction comprises a module-specific correction.

17. An apparatus comprising:
  first means for capturing first image data for at least one first image, where the first image data is captured with an optical image stabilizer of the first means for capturing deactivated;
  second means for capturing second image data for at least one second image, where the second image data is captured with an optical image stabilizer of the second means for capturing activated;
  means for obtaining an optical image stabilizer correction based on a comparison between the first image data and the second image data; and
  means for applying the optical image stabilizer correction to the second image data in order to correct at least one effect of the optical image stabilizer on the second image data.

18. The apparatus of claim 17, where the means for applying the optical image stabilizer correction to the second image data is further for multiplying the second image data by a total correction that is at least in part based on the optical image stabilizer correction.

19. The apparatus of claim 17, where the first image data and the second image data are captured sequentially by the first means for capturing and the second means for capturing.

20. The apparatus of claim 17, further comprising: means for replacing at least one point of data from the optical image stabilizer correction with interpolated data.

* * * * *